United States Patent [19]

Bell

[11] Patent Number: 5,529,361

[45] Date of Patent: Jun. 25, 1996

[54] HAND-HELD SPOOL TRANSPORT TOOL

[76] Inventor: Carol W. Bell, 1618 Dawnville Rd., Dalton, Ga. 30721

[21] Appl. No.: 390,214

[22] Filed: Feb. 16, 1995

[51] Int. Cl.⁶ .................................................. B65G 7/12
[52] U.S. Cl. ......................................... 294/97; 294/19.1
[58] Field of Search .................. 294/15, 16, 19.1–19.3, 294/25, 86, 24, 93–95, 97, 98, 111, 115, 126–130; 29/270, 278, 280, 283; 242/129, 572, 574, 574.4

[56] References Cited

U.S. PATENT DOCUMENTS

| | | | |
|---|---|---|---|
| 2,322,164 | 6/1943 | Scudder | 294/19.1 X |
| 4,083,593 | 4/1978 | Lynn | 294/97 |
| 4,377,956 | 3/1983 | Cooper | 294/95 X |
| 4,422,684 | 12/1983 | Zitzman | 294/97 |
| 4,577,899 | 3/1986 | Hemingway | 294/97 X |
| 4,758,035 | 7/1988 | Shimasaki | 294/19.1 |
| 5,195,794 | 3/1993 | Hummel et al. | 294/94 |

*Primary Examiner*—Johnny D. Cherry

[57] ABSTRACT

A hand-held spool transport tool including a tubular body having a base end, a tip end, a plunging compartment formed therein near the tip end, and a trigger compartment formed therein near the base end; a generally dome-shaped forward guide axially aligned with the body and coupled to the tip end thereof; a pair of generally opposed elongated claws with each claw having an inboard end and an outboard end and with each inboard end pivotally coupled to the body; a handle coupled to the base end of the body for allowing a user a firm grip; a plunger slidably extended between the plunging compartment and the trigger compartment; a pair of wire cables with each wire cable secured between the plunger and one of the outboard ends of one of the claws; a spring mechanism for urging the plunger toward the forward guide; and a user-actuatable trigger mechanism secured to the plunger for extending and retracting the claws.

5 Claims, 3 Drawing Sheets

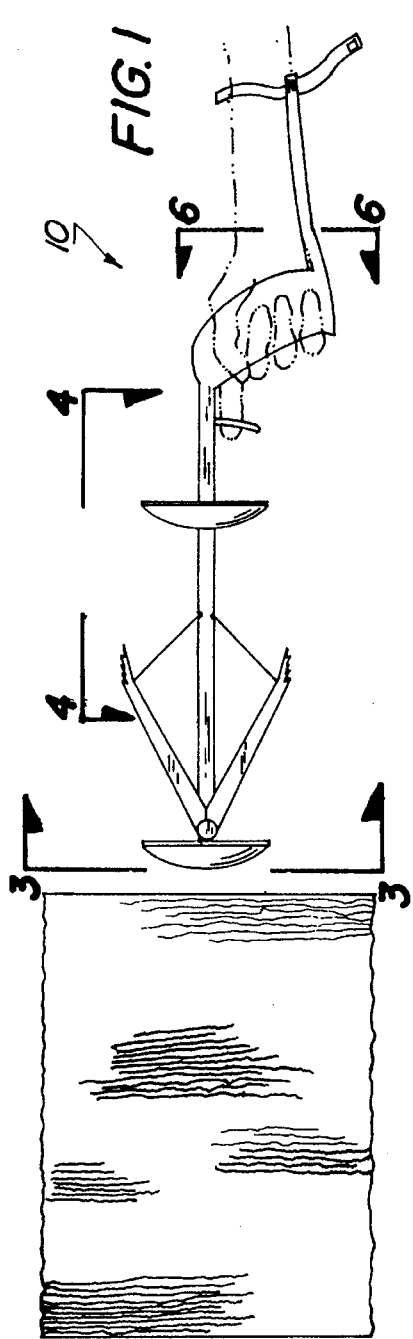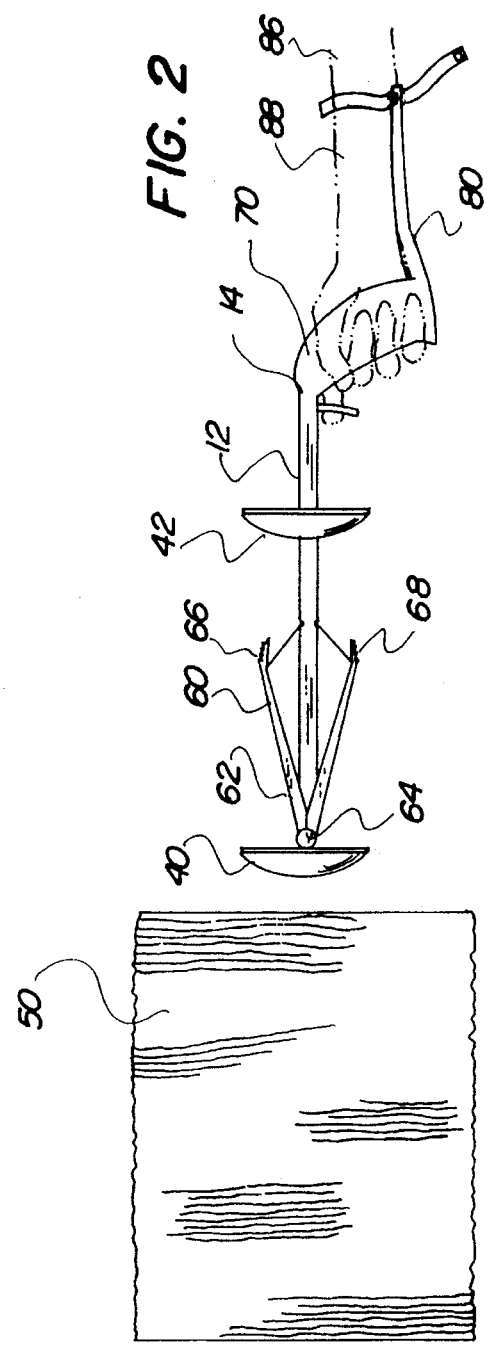

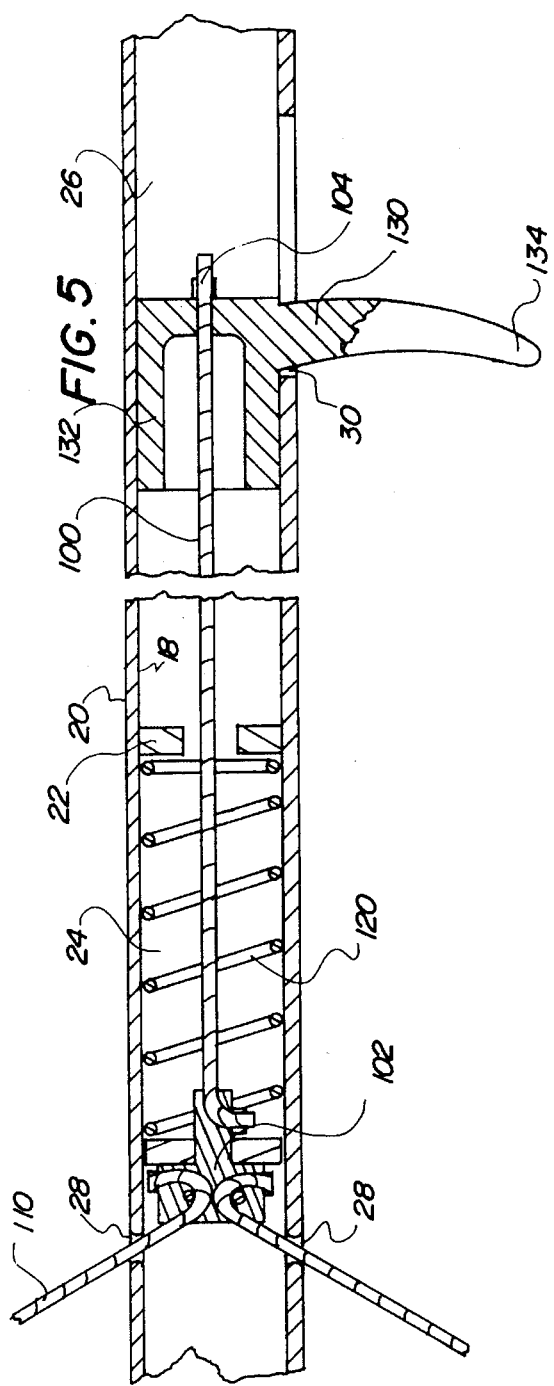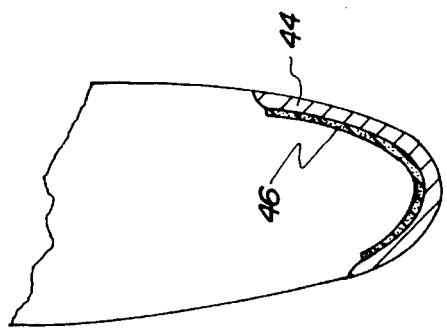

HAND-HELD SPOOL TRANSPORT TOOL

BACKGROUND OF THE INVENTION

1. Field of the Invention

The present invention relates to a hand-held spool transport tool and more particularly pertains to allowing a user to readily pick up and carry a spool or cone of yarn from one location to another with a hand-held spool transport tool.

2. Description of the Prior Art

The use of spool carrying tools is known in the prior art. More specifically, spool carrying tools heretofore devised and utilized for the purpose of allowing a user to carry spools of material are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,283,826 to Miller discloses a tube extracting mechanism. U.S. Pat. No. 4,377,956 to Cooper discloses a pipe extractor tool. U.S. Pat. No. 5,088,591 to Grecksch et al. discloses a tube transport assembly for transporting yarn packages on a textile machine including a vertical transport component. U.S. Pat. No. 5,088,784 to Foote, Jr. discloses an apparatus and method for transporting a spool of web material. U.S. Pat. No. 5,094,496 to King, Sr. discloses pipe pulling devices. U.S. Pat. No. 5,136,834 to Stadele discloses an apparatus for transporting bobbin tools of a textile machine.

While these devices fulfill their respective, particular objective and requirements, the aforementioned patents do not describe a hand-held spool transport tool that has a pistol-like shape for easy gripping and carrying and is actuated for spool-transporting operations through the depression and release of its trigger.

In this respect, the hand-held spool transport tool according to the present invention substantially departs from the conventional concepts and designs of the prior art, and in doing so provides an apparatus primarily developed for the purpose of allowing a user to readily pick up and carry a spool or cone of yarn from one location to another.

Therefore, it can be appreciated that there exists a continuing need for new and improved hand-held spool transport tool which can be used for allowing a user to readily pick up and carry a spool or cone of yarn from one location to another. In this regard, the present invention substantially fulfills this need.

SUMMARY OF THE INVENTION

In the view of the foregoing disadvantages inherent in the known types of spool carrying tools now present in the prior art, the present invention provides an improved hand-held spool transport tool. As such, the general purpose of the present invention, which will be described subsequently in greater detail, is to provide a new and improved hand-held spool transport tool and method which has all the advantages of the prior art and none of the disadvantages.

To attain this, the present invention essentially, in combination, an elongated rigid tubular body having a base end, a tip end, an interior surface, an exterior surface, and an annular interior wall extended inwards from the interior surface to define a plunging compartment near the tip end and a trigger compartment near the base end. The body also has a pair of diametrically opposed wire holes disposed thereon in communication with the plunging compartment and a trigger hole disposed thereon in communication with the trigger compartment. A generally dome-shaped forward guide and a generally dome-shaped rearward guide are included with the forward guide axially aligned with the body and coupled to the tip end thereof and with the rearward guide axially aligned with and coupled about the body between the ends thereof. Each guide has a diametric extent sized for contacting an interior surface of a spool or cone of yarn. A pair of diametrically opposed elongated rigid claws is included. Each claw has an inboard end pivotally coupled to the body near the forward guide and an outboard toothed end generally projected toward the rearward guide. A handle is provided and coupled to and extended outwards from the base end of the body for allowing a user a firm grip. A padded frame is coupled to a lower extent of the handle and projected outwards in general alignment with the body. The frame has a length such that a rearward extent thereof is placed in contact with a forearm of a user when the user grips the handle. A strap is affixed to the frame and is securable in a closed-loop configuration about the forearm of the user. An elongated rigid plunger is included and slidably disposed within the body. The plunger has a head end extended within the plunging compartment and a rear end extended within the trigger compartment. A pair of elongated flexible wire cables is provided with each wire cable having one end coupled to the head end of the plunger and another end extended through one of the wire holes of the body and secured to one of the outboard ends of one of the claws. A spring is disposed between the head end of the plunger and the interior wall of the body for urging the plunger toward the forward guide. Lastly, a trigger is included and has an upper portion disposed within the trigger compartment and secured to the rear end of the plunger and a lower portion extended through the trigger hole for actuation by a user. The trigger is actuatable with a force for allowing inward extension of the claws. The trigger is further releasable for allowing outward extension of the claws for gripping a spool or cone of yarn.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conceptions, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hand-held spool transport tool which has all the advantages of the prior art spool carrying tools and none of the disadvantages.

It is another object of the present invention to provide a new and improved hand-held spool transport tool which may be easily and efficiently manufactured and marketed.

It is a further object of the present invention to provide a new and improved hand-held spool transport tool which is of durable and reliable construction.

An even further object of the present invention is to provide a new and improved hand-held spool transport tool which is susceptible of a low cost of manufacture with regard to both materials and labor, and which accordingly is then susceptible of low prices of sale to the consuming public, thereby making such a hand-held spool transport tool economically available to the buying public.

Still yet another object of the present invention is to provide a new and improved hand-held spool transport tool which provides in the apparatuses and methods of the prior art some of the advantages thereof, while simultaneously overcoming some of the disadvantages normally associated therewith.

Even still another object of the present invention is to provide a new and improved hand-held spool transport tool for allowing a user to readily pick up and carry a spool or cone of yarn from one location to another.

Lastly, it is an object of the present invention to provide a new and improved hand-held spool transport tool comprising a tubular body having a base end, a tip end, a plunging compartment formed therein near the tip end, and a trigger compartment formed therein near the base end; a generally dome-shaped forward guide axially aligned with the body and coupled to the tip end thereof; a pair of generally opposed elongated claws with each claw having an inboard end and an outboard end and with each inboard end pivotally coupled to the body; a handle coupled to the base end of the body for allowing a user a firm grip; a plunger slidably extended between the plunging compartment and the trigger compartment; a pair of wire cables with each wire cable secured between the plunger and one of the outboard ends of one of the claws; spring means for urging the plunger toward the forward guide; and trigger means secured to the plunger for extending and retracting the claws.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side-elevational view of the preferred embodiment constructed in accordance with the principles of the present invention in an extended position for gripping a spool of material such as yarn.

FIG. 2 is another side-elevational view of the present invention in a retracted position for insertion into or retraction from a spool of material.

FIG. 5 is a cross-sectional view of the present invention taken along the line 5—5 of FIG. 4.

FIG. 6 is a fragmentary cross-sectional view of one of the guides of the present invention taken along the line 6—6 of FIG. 1.

The same reference numerals refer to the same parts through the various Figures.

DESCRIPTION OF THE PREFERRED EMBODIMENT

Figures 3, 4:
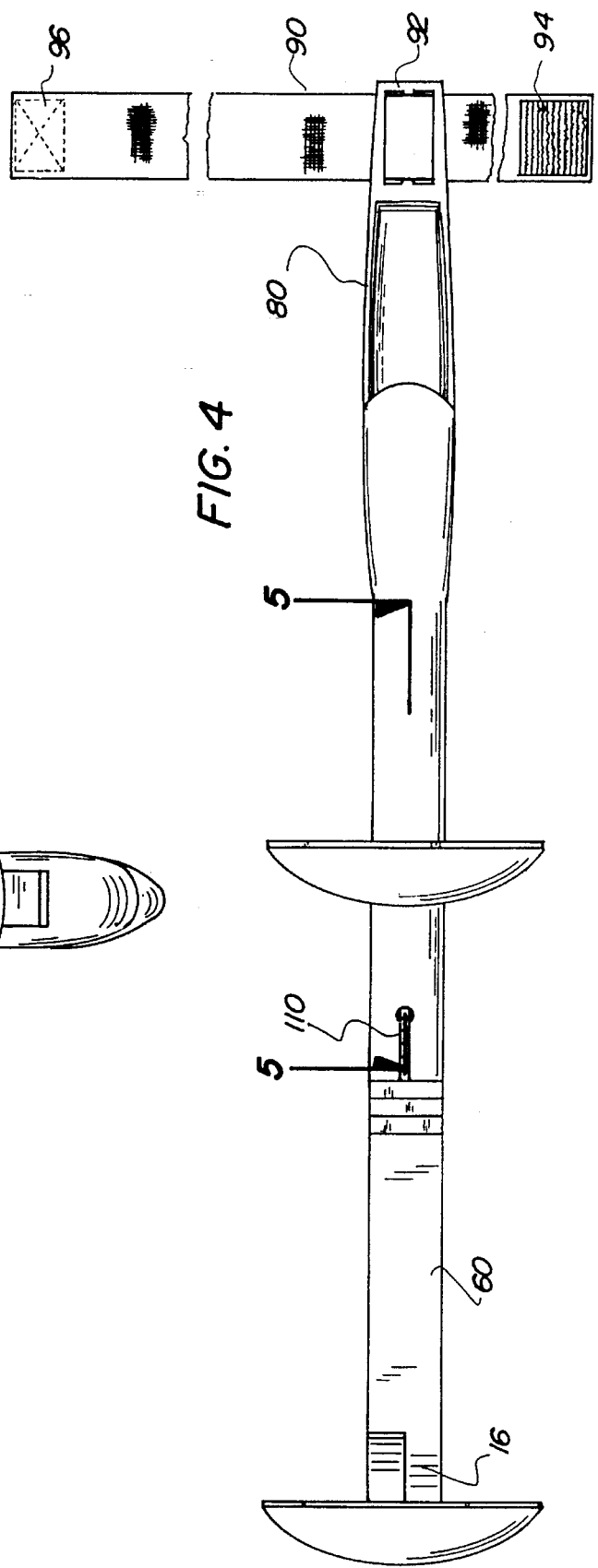
FIG. 3 is an end view of the preferred embodiment of the present invention taken along the line 3—3 of FIG. 1.
FIG. 4 is a plan view of the preferred embodiment of the present invention taken along the line 4—4 of FIG. 1.

With reference now to the drawings, and in particular, to FIG. 1 thereof, the preferred embodiment of the new and improved hand-held spool transport tool embodying the principles and concepts of the present invention and generally designated by the reference number 10 will be described.

The present invention is comprised of a plurality of components. In their broadest context, such components include a body, guides, and a spring-loaded claw mechanism. Such components are individually configured and correlated with respect to each other to provide the intended function of allowing a user the capability to readily pick up and carry a spool or cone of yarn from one location to another.

Specifically, the present invention includes a rigid body 12 as shown in FIG. 2. The body has a base end 14, a tip end 16, an interior surface 18, and an exterior surface 20. As best illustrated in FIG. 5, an annular interior wall 22 is extended inwards from the interior surface to define a plunging compartment 24 and a trigger compartment 26. The plunging compartment is located near the tip end 16 and the trigger compartment is located near the base end 14. Both compartments are placed in communication with each other through the annular wall 22. The body has a pair of diametrically opposed wire holes 28 disposed thereon. The wire holes are placed in communication with the plunging compartment. The body also has a trigger hole 30 disposed thereon. The trigger hole is placed in communication with the trigger compartment 26. The trigger hole is further generally longitudinally aligned with one of the wire holes of the body.

A generally dome-shaped forward guide 40 and a generally dome-shaped rearward guide 42 are provided. As shown in FIG. 6, each guide is formed of an external plastic cup 44 with an interior foam lining 46. The cup 44 is rigid in structure. The forward guide 40 is axially aligned with the body and coupled to the tip end 16. The rearward guide 42 is axially aligned with and coupled about the body between the ends 14, 16. Each guide has a diametric extent sized for contacting an interior surface of a spool 50 or cone of yarn when disposed therein as best shown in FIG. 1.

To provide gripping action between the present invention and a spool or cone of material such as yarn, a pair of diametrically opposed claws 60 is included. Each claw is elongated and rigid in structure. Each claw has an inboard end 62 pivotally coupled to the body near the forward guide 40 with a bolt 64. Each claw also includes an outboard end 66 generally projected away from the body and toward the rearward guide as illustrated in FIGS. 1 and 2. The outboard end 66 includes a plurality of teeth 68 formed thereon. The teeth are projected outwardly from the outboard end for gripping a recipient interior surface of a spool or cone of material.

A handle 70 is coupled to and extended downwards from the base end 14. The handle is generally tubular in structure. The handle allows a user a firm grip for maneuvering the body 12.

A padded rigid frame 80 is coupled to a lower extent of the handle and projected outwards therefrom. The frame is generally aligned with the body 12. The frame has a length such that a rearward extent thereof is placed in contact with a forearm 86 and a wrist 88 of a user when the user grips the handle as shown in FIG. 2. A strap 90 is affixed to the frame 80 with buckle 92. The strap is formed of a canvas material or other similar flexible material. The strap includes a rectangular strip of pile-type fastener 94 sewn to one end and a rectangular strip of complimentary pile-type fastener 96 sewn to the other end as shown in FIG. 4. The fasteners 94, 96 are securable together for placing the strap in a closed loop configuration about a forearm of a user.

As best illustrated in FIG. 5, an elongated rigid plunger 100 is slidably disposed within the body 12. The plunger has a head end 102 extended within the plunging compartment 24 and a rod with a rear end 104 extended within the trigger compartment.

To actuate the claws, a pair of elongated flexible wire cables 110 are provided. Each wire cable has one end coupled to the head end 102 of the plunger and another end extended through one of the wire holes 28 of the body and secured to one of the outboard ends 66 of one of the claws. A spring 120 is disposed between the head end of the plunger and the interior wall 22 of the body. The spring has sufficient resilience for urging the plunger toward the forward guide, thereby causing the claws 60 to be extended outwards.

Lastly, a trigger 130 is included. The trigger has an upper portion 132 disposed within the trigger compartment 26 and secured to the rear end 104 of the plunger. The trigger also has a curved lower portion 134 extended through the trigger hole 30. The trigger is actuatable by a user with a force applied by a finger for allowing inward extension of the claws as shown in FIG. 2. The trigger is also releasable by a user for allowing outward extension of the claws for gripping a spool or cone of yarn when disposed therein as shown in FIG. 1.

The present invention is a tool designed to allow a user to easily pick up spools of fiber such as yarn and thereby decrease possible injury to a user's wrist. The present invention also prevents repetitive stress disorders of the wrist and hand of a user that can occur when the user carries heavy spools or cones of fiber. The present invention allows a user to lift spools or cones of yarn weighing up to 30 pounds. Support for a user's forearm is provided by a padded frame that extends from the handle. After inserting the present invention into a spool, the spring-loaded claws press outwards against the sides of the core of the spool, thereby holding the spool securely as it is lifted and moved.

To release the spool, the user squeezes the trigger, which causes the claws to retract and release contact with the spool. The present invention is formed of light weight rigid materials such as a combination of a plastic and aluminum alloy. The handle and frame are padded to provide optimal comfort. Consistent use of the present invention will help prevent repetitive stress disorders for textile workers who handle spools or cones of yarn. The frame has a shape that generally conforms to a peripheral extent of a user's wrist and forearm.

In the preferred embodiment, the present invention is approximately 5 inches in length. The handle of the present invention is generally tubular in shape and has a diametric extent of about 1.25 to 1.75 inches. The frame of the present invention is approximately 6 to 9 inches in length.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A hand-held spool transport tool for allowing a user to readily pick up and carry a spool or cone of yarn from one location to another comprising, in combination:

an elongated rigid tubular body having a base end, a tip end, an interior surface, an exterior surface, and an annular interior wall extended inwards from the interior surface to define a plunging compartment near the tip end and a trigger compartment near the base end, the body further having a pair of diametrically opposed wire holes disposed thereon in communication with the plunging compartment and a trigger hole disposed thereon in communication with the trigger compartment;

a generally dome-shaped forward guide and a generally dome-shaped rearward guide with the forward guide axially aligned with the body and coupled to the tip end thereof and with the rearward guide axially aligned with and coupled about the body between the ends thereof, each guide having a diametric extent sized for contacting an interior surface of a spool or cone of yarn;

a pair of diametrically opposed elongated rigid claws, each claw having an inboard end pivotally coupled to the body near the forward guide and an outboard toothed end generally projected toward the rearward guide;

a handle coupled to and extended outwards from the base end of the body for allowing a user a firm grip;

a padded frame coupled to a lower extent of the handle and projected outwards in general alignment with the body and with the frame having a length such that a rearward extent thereof is placed in contact with a forearm of a user when the user grips the handle;

a strap affixed to the frame and with the strap securable in a closed-loop configuration about the forearm of the user;

an elongated rigid plunger slidably disposed within the body, the plunger having a head end extended within the plunging compartment and a rear end extended within the trigger compartment;

a pair of elongated flexible wire cables with each wire cable having one end coupled to the head end of the plunger and another end extended through one of the wire holes of the body and secured to one of the outboard ends of one of the claws;

a spring disposed between the head end of the plunger and the interior wall of the body for urging the plunger toward the forward guide; and a trigger having an upper portion disposed within the trigger compartment and secured to the rear end of the plunger and a lower portion extended through the trigger hole for actuation by a user and with the trigger actuatable with a plunging force for allowing inward extension of the claws and with the trigger further releasable for allowing outward extension of the claws for gripping a spool or cone of yarn.

2. A hand-held spool transport tool comprising:

a tubular body having a base end, a tip end, a plunging compartment formed therein near the tip end, and a trigger compartment formed therein near the base end;

a generally dome-shaped forward guide axially aligned with the body and coupled to the tip end thereof;

a pair of generally opposed elongated claws with each claw having an inboard end and an outboard end and with each inboard end pivotally coupled to the body;

a handle coupled to the base end of the body for allowing a user a firm grip;

a plunger slidably extended between the plunging compartment and the trigger compartment;

a pair of wire cables with each wire cable secured between the plunger and one of the outboard ends of one of the claws;

spring means for urging the plunger toward the forward guide; and trigger means secured to the plunger for extending and retracting the claws.

3. The hand-held spool transport tool as set forth in claim 2 and further comprising a generally dome-shaped rearward guide axially aligned with and coupled about the body between the ends thereof for contacting an interior surface of a spool or cone of material.

4. The hand-held spool transport tool as set forth in claim 2 and further comprising:

a padded frame coupled to the handle and projected away from the body and with the frame having a length such that a rearward extent thereof is placed in contact with a forearm of a user when the user grips the handle; and a strap affixed to the frame and with the strap securable in a closed-loop configuration about the forearm of the user.

5. The hand-held spool transport tool as set forth in claim 2 wherein the outboard end of each claw has a plurality of teeth formed thereon for gripping a recipient surface.

* * * * *